Oct. 22, 1963   R. T. H. COLLIS   3,108,269
PRECIPITATION-INDICATING SYSTEM
Filed Jan. 9, 1962   2 Sheets-Sheet 1
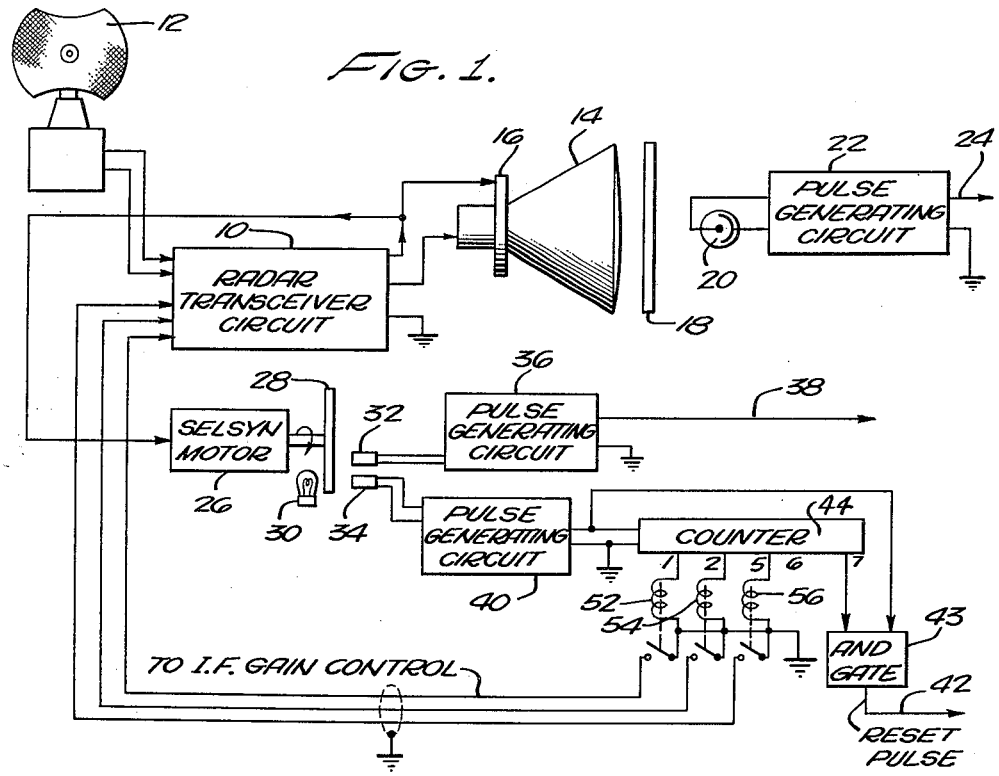
FIG. 1.
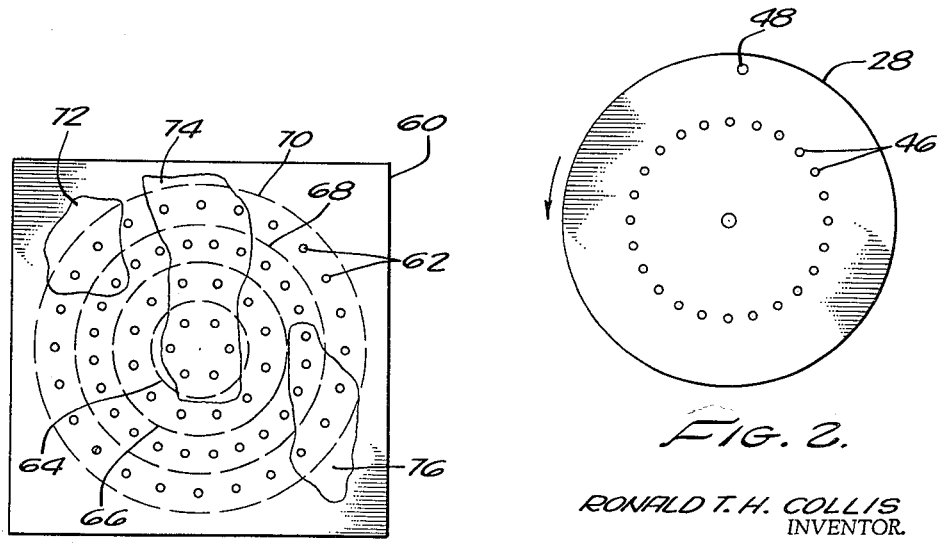
FIG. 2.
FIG. 3.
RONALD T. H. COLLIS
INVENTOR.
BY Lyon Lyon
ATTORNEYS

RONALD T.H. COLLIS
INVENTOR.

BY Lyon & Lyon
ATTORNEYS

United States Patent Office 3,108,269
Patented Oct. 22, 1963

3,108,269
PRECIPITATION-INDICATING SYSTEM
Ronald T. H. Collis, Menlo Park, Calif., assignor to Stanford Research Institute, Menlo Park, Calif., a corporation of California
Filed Jan. 9, 1962, Ser. No. 165,127
10 Claims. (Cl. 343—5)

This invention relates to weather radar data-processing-and-transmission systems, and, more particularly, to improvements therein.

The use of radar for measuring rainfall and determining the location of such rainfall by meteorological bureaus is not new. Such radar installations are usually at an advantageous location where an observer, by watching the scope of the radar, can obtain information and forward it to locations from which the distribution of the information can occur. Heretofore, a trained observer has been required to watch the radar system to interpret the information displayed on its scope. The transmission of such information and the re-interpretation of the information transmitted for the users required the work of skilled individuals.

An object of this invention is to provide a system for converting data of the type displayed on a precipitation-measuring radar scope into information indicative of the location, intensity, and amount of rainfall which is simple to understand.

Another object of this invention is the provision of apparatus for converting the information displayed on a precipitation-observing radar scope to a form which is simple to transmit and to interpret by a receiver.

Yet another object of the present invention is the provision of a unique and simple system for converting the information displayed on a precipitation-detecting radar scope to a form which may easily be understood when displayed and which may be simply transmitted over wire or radio to remote locations, if required.

These and other objects of the invention may be achieved in an arrangement wherein initially a mask having apertures disposed thereover at as many points as are desired to be observed is placed over the front end of the cathode-ray tube of any suitable weather radar. Photomultiplier apparatus is employed to produce a pulse each time light from the face of the cathode-ray tube passes through one of the apertures in the mask. The holes in the mask are so disposed that at any instant the cathode-ray tube face can be seen through one hole only.

An addressing system is also provided. This includes a selsyn motor, which is connected in parallel with the rotating coil of the cathode-ray tube, if the radar receiver is of the plan-position-indicator type, or which is driven from the rotating antenna of the radar system, if of some other type. The selsyn motor rotates a disc perforated with holes lying on a circle in such a way that a hole passes in front of a narrow light source immediately before the beam of the cathode-ray tube can illuminate an aperture in the perforated mask. A phototube then can operate a pulse-producing circuit to provide an address pulse for each hole in the mask in front of the cathode-ray tube. A radar echo is proportional to rainfall intensity and the reciprocal of the square of the range. The presence or absence of a precipitation-indicating pulse at any address can thus be evaluated (on a less-than or more-than a preset-level basis) by reference to the range and sensitivity of the radar system. Range is known and sensitivity may be varied, for instance, by varying the intermediate-frequency gain.

The addresses may be divided into four range classes along the radius of the sweep on the cathode-ray tube. The radar receiver is gated so that echoes are shown only within one range class at a time. By providing additional holes in the rotating mask driven by the selsyn motor and by providing additional photo-tube circuitry, it is possible to generate a signal which controls the intermediate-frequency amplitude of the radar circuits, where the range desired to be displayed is selected. Furthermore, the gain of the radar receiver may be compensated to provide range correction. Thus, for the nearer range classes, the gain is reduced, and, for the further-out range classes, the gain may be increased. In radar systems where range correction is already performed electronically, this expedient need not be resorted to. In either case, the intensity of the precipitation reported by the system can be evaluated by making a number of scans with the radar at successively altered sensitivity levels. The sensitivity level and the presence of a precipitation-indicating pulse may then be used for indicating over an interval the amount of precipitation at any one of the signaling locations.

A receiving station in accordance with this invention may have a presentation, such as a map of the area under survey, with lights illuminating the region on the map over which precipitation is occurring. Each time a new survey of the entire area is initiated the illuminated lights are turned off. Accordingly, an observer may watch the progress of a rainfall by seeing the path effectively drawn by these lights across a map on the front of the observing mask. Furthermore, the intensity of the rainfall occurring may be signaled by the color of the illuminated lights. Finally, the amount of precipitation occurring at each of the locations in an area may be obtained by integrating over a predetermined interval the intensity information.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a schematic drawing of the apparatus at a transmitting location in accordance with this invention;

FIGURE 2 is a view of a mask used for generating address information;

FIGURE 3 is a drawing which can represent the precipitation-indicating mask at either the receiving or transmitting location;

Figure 4:
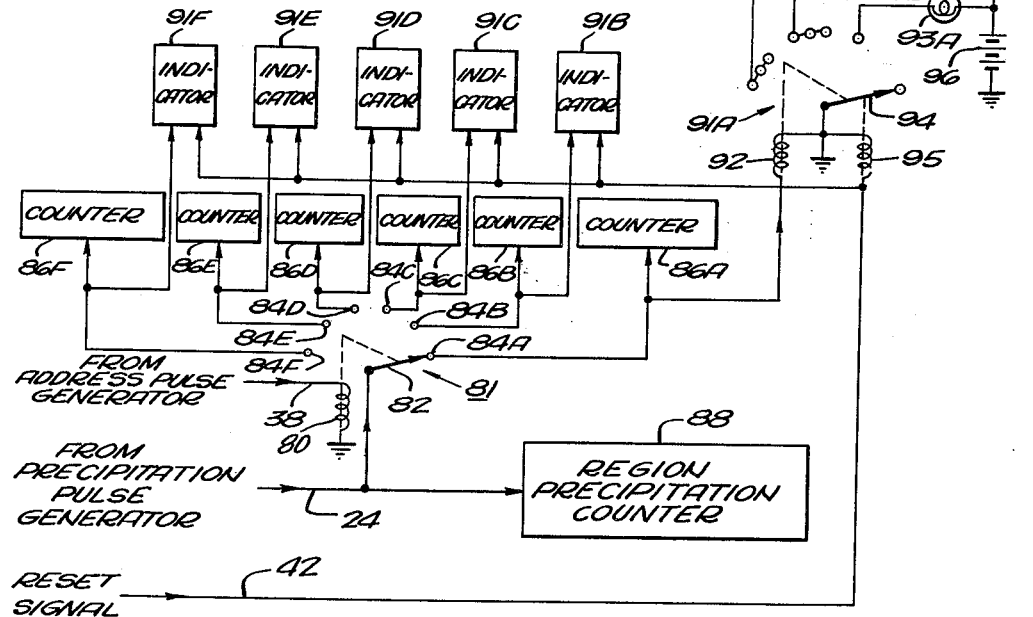
FIGURE 4 is a circuit schematic drawing of the apparatus at a receiving location in accordance with this invention.

Reference is now made to FIGURE 1, where there may be seen a block-schematic diagram of the portion of the embodiment of the invention which converts the precipitation information displayed on the cathode-ray tube of a radar system into information which can be readily understood, even by those who have never seen a plan-position-indicator radar display. The apparatus shown in FIGURE 1 shows a radar system which includes the radar transceiver circuits 10, the radar antenna 12 connected to the circuits 10, and the display cathode-ray tube oscilloscope 14 having on the neck thereof a rotating deflection coil 16. This type of radar system is well known and presents a display, consisting of a rotating radius of a circle, which brightens at points therealong, indicative of an object or objects from which a reflection is derived. The range of the system is displayed from the center of the circle outward along the radius.

In accordance with this invention, a perforated mask 18 is positioned in front of the display cathode-ray tube 14. This mask will have a plurality of apertures which are positioned at points which are opposite to and correspond to the points on the display cathode-ray tube which are desired to be specifically inspected. Opposite the perforated mask, a photo-multiplier tube 20 is positioned, so that any light which passes through one of the apertures of the mask causes the photomultiplier 20 to provide an output signal. This output signal is applied to the pulse-generating circuit 22, which emits a pulse and applies it to the transmission line 24. The pulse-generating circuits may comprise a relay, or blocking oscillator. As the radar scans a region for precipitation, such precipitation is indicated on the face of the cathode-ray tube as a brightening of the rotating radius over the location of the precipitation. This can be seen by the photomultiplier tube through those apertures in the mask which are positioned at locations opposite the lighted portions on the face of the cathode-ray tube. Thus, the signals applied to the transmission line 24 comprise a pulse train, representative of the precipitation distribution detected by the scanning radar. Care is taken in making the apertures in the mask to place them so that only one aperture may be illuminated at a time by the light output from the cathode-ray tube face. Where an "A-scope" type display is used, the mask 18 may be rotated to provide the precipitation-pulse information.

A selsyn motor 26 is operated in parallel with the rotating deflection coil 16. The selsyn motor rotates a second perforated mask 28, in synchronism with the rotating scan of the radar system. At one side of the mask 28 is a light source 30. On the other side of the mask 28 is a second photocell 32 and a third photocell 34. The output of the second photocell 32 is applied to a pulse-generating circuit 36, which can be the same as the circuit 22. Output from the pulse-generating circuit 36 is applied to a second transmission line 38. The output of the third photocell 34 is applied to another pulse-generating circuit 40, the output of which is applied to a transmission line 42 and to an intensity-control counter 44.

As may better be seen in FIGURE 2, the mask 28 has a group of apertures 46 arranged in a circle, which equal in number the number of apertures in the perforated mask 18. These apertures are positioned so that a pulse, which is generated and applied to the transmission line 38 as a result of the light from the source 30 passing through an aperture, will occur just ahead of a pulse which can occur as a result of light passing through a corresponding aperture in the mask 18. The reason for generating these aperture-address pulses ahead of the precipitation-indicating pulses for each corresponding aperture is to enable an indicator in subsequent apparatus to be addressed before the pulse, indicative of precipitation, can reach the addressed indicator.

The intensity of a received and displayed radar echo varies with the intensity of the precipitation, giving rise to the echo. However, the relationship between the two is not a linear one. It is convenient to divide the relationship into different classes, each of which is evaluated in units of precipitation. Thus, by way of example, class 1 represents one unit of precipitation, class 2 represents four units of precipitation, and class 3 represents seven units of precipitation.

The sensitivity level of the radar receiver may be programmed so that it, together with the number of radar scans, may be employed for indicating the class or intensity of precipitation and the number of precipitation units present at each location. By integration, the total precipitation at a location or over an area may be obtained.

The mask 28 has an additional aperture 48, which is positioned to permit light from the source 30 to energize a photocell 34, and, thereafter, pulse-generating circuit 40, just before the antenna 12 initiates a new scan. Thus, a pulse is emitted by the pulse-generating circuit 40 before the commencement of each new scanning cycle. This pulse is applied to an intensity-control counter 44. The first count output of the counter energizes relay 52, and, when its contacts close, the radar intermediate-frequency amplifier gain is set so that a sensitivity level corresponding to class 1 is established. Only echoes which exceed in amplitude the value established by the sensitivity-level setting will cause a light output on the cathode-ray tube screen. Thus, all precipitation-indicating pulses resulting at this time can be designated as class 1 pulses.

Just before commencing a second scan, the intensity-control counter is advanced to its second count condition. This energizes a relay 54, and, when its contacts close, the sensitivity level of the radar receiver is established, so that only precipitation echoes greater than a predetermined amplitude will give rise to precipitation-indicating pulses. These are designated as class 2 pulses. These occur while the radar-receiver sensitivity is less than it was for class 1 pulses. It should be understood that the value, from a precipitation-unit standpoint, of the class 2 pulses is the same as the class 1 pulses. However, by requiring that the counter 44 advance to its fifth count before establishing the next sensitivity level, the number of class 2 pulses that can be collected from any given location is three times that collected during the class 1 scan time.

The counter 44 is advanced through counts 5, 6, and 7 before being reset to its first count state by the eighth output from the pulse-generating circuit 40. Thus, there are three class 3 pulses collected from any given location. Recapitulating the above, for a given location, which has precipitation of class 3 intensity, seven pulses are collected; for class 2 intensity, four pulses are collected; and for class 1, one pulse is collected.

An AND gate 43 is used to generate a reset pulse for the receiving equipment. The input to the AND gate is the input to counter 44, as well as the output of the counter when in its seventh count state. The coincidence of these two inputs occurs on the eighth input pulse to the counter, at which time the AND gate 43 can generate an output which is applied to the line 42.

Referring back to FIGURE 1, the output of the pulse-generating circuit 40 is applied to an intensity-control counter 44. The output of the counter, when in its first count condition, energizes relay 52. The second count output of counter 44 energizes a relay 54. The fifth count output of the counter is employed to energize a relay 56. Thus, sequencing of the counter 44 successively energizes the relays and successively closes their contacts. This enables control of the gain of the intermediate-frequency section of the radar transceiver circuits in well-known manner.

FIGURE 3 is a plan view of the type of aperture mask which may be employed, either in signal generation, such as the mask 18, or at a location at which the information obtained is to be displayed. Such a mask 60 has a plurality of apertures 62, which, as previously indicated, are disposed at positions corresponding to locations, the precipitation condition of which is desired to be indicated.

An apertured mask 60 is placed at a receiver location at which it is desired to display the precipitation information. The apertures in the mask may be positioned at locations corresponding to those in the signal-generating mask. To make the display simple and readily intelligible, the mask 60 may have a map of the region which is being scanned on the front thereof. Thus, the shapes 72, 74, and 76 can correspond, for example, to land portions in this region, and the remainder of the region is water. A rainstorm moving from left to right across the land will be represented by illuminated apertures 62, which progress from left to right across the map on the front of the mask 60. The number of these illuminated apertures corresponds to the number of points or apertures within the region of the precipitation as displayed by the cathode-ray tube 14. As will be also shown below, the precipitation intensity is displayed by the cathode-ray tube 14. As will be also shown below, the precipitation intensity is displayed at each location by the color of the illumination. It should be appreciated, therefore, that no experience is required to interpret the display presented in accordance with this invention of a map of a region with lights identifying an area in that region in which precipitation is occurring. A direct presentation is made with conventional means. The map can be of any convenient size and may be viewed in direct light. Furthermore, as will be more fully explained, by using colored lights, the intensity of the precipitation may also be presented.

Reference is now made to FIGURE 4, which is a circuit diagram of the apparatus required for displaying the information generated at the transmitter. This comprises a stepping switch 81, having a solenoid 80 and a movable arm 82 which, as is well known, successively moves to each of the contacts 84A through 84F. The stepping switch is of the type which is returned to the first contact 84A, after leaving the last contact 84F. There are as many contacts 84A through 84F as there are apertures in the mask 18. Thus, each contact corresponds to a location for which a precipitation indication is to be provided. The stepping switch has its solenoid 80 connected to receive address pulses over the line 38 and steps the arm 82 from contact to contact in response thereto. The arm 82 is connected to receive precipitation pulses over the line 24.

A different counter 86A through 86F is connected to each one of the contacts 84A through 84F. These counters serve to collect the precipitation pulses at each location and thus indicate the total precipitation at that location. Another counter 88 may be provided to count the total number of precipitation pulses for the entire region being scanned. This counter is connected to receive these pulses over the line 24. The counters may be of either the electronic or electromechanical type, which can indicate the total count and thereby the total amount of precipitation.

For visually presenting the location and for indicating the intensity of the precipitation, there is provided, for each aperture of the mask 60 shown in FIGURE 3, 3 lamps, respectively 93A, 93B, 93C. These can respectively provide white, green, or red light. These are positioned behind each aperture so that light from whichever one of the three is illuminated will shine through the aperture. Since three of these lamps are required for each aperture, actually three are required for each one of the contacts 84A through 84F. Only the lamps and their associated circuitry, generally designated by reference numeral 91A, are shown for the first contact 84A, in order to preserve clarity in the drawings. The indicators for the remaining contacts are represented by rectangles 91B through 91F.

Another selecting switch, having a solenoid 92 and switch arm 94, is provided for each of the contacts 84A through 84F. This serves for selecting for illumination the one of the lamps 93A, 93B, 93C which indicates the intensity of the precipitation at the selected location. For class 1 precipitation intensity, only one precipitation pulse is applied to solenoid 92. A circuit is completed for the white lamp 93A with the potential source 96 by the switch arm 94. Should one to three more precipitation pulses be received indicative of class 2 precipitation intensity, then switch arm 94 is moved to make an energizing circuit for the green lamp 93B. Should a fifth through a seventh precipitation pulse be received, indicative of a class 3 precipitation intensity, then the switch arm connects the red light 93C into the circuit.

The light indicative of the precipitation intensity at each location is maintained illuminated until all of the locations have been scanned. At that time, a reset-pulse output is applied from the AND gate 43 (shown in FIGURE 1) to the reset solenoid 95 of all of the switches 91, to reset them to a non-indicating position. The counters are not reset, but retain their respective counts. At that time, the stepping switch 81 starts sequencing through the contacts 84A through 84F again, to update the precipitation information displayed at each location.

It should be noted that the counter presentation and the illuminated-map presentation are separable. Either one or both may be used. Indeed, if desired, the counter outputs may be used to drive indicators behind each aperture, to show the total precipitation at each location on a display map.

Figure 5:
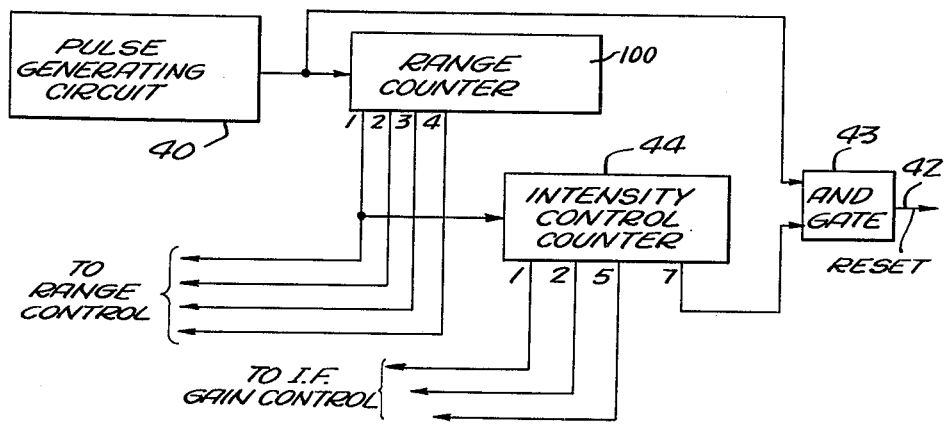
FIGURE 5 is a modification of the invention shown in FIGURE 1, whereby scanning of an area by successive ranges is available.

FIGURE 5 illustrates a modification of FIGURE 1, whereby successive ranges of an area are scanned for precipitation. By dividing the addresses into a number of range classes and gating the video trace to show echoes within only one range increment or class at a time, it is possible to cover the full number of addresses in more than one scan of the antenna. By way of example, the addresses and the range are divided into four consecutive portions. These consecutive portions are defined by the dotted-line circles shown on the mask in FIGURE 3. Thus, the first scan is of the region about the center of the mask defined by the circle 64. The second scan takes in the annulus portion defined between the center circle 64 and the circle 66. The third scan is an annulus portion between the circle 66 and the circle 68. The fourth scan takes in an outer annulus adjacent the second annulus defined between circles 68 and 70. This completes the scan of the region being monitored for precipitation. Thus, four rotations of the region being scanned are required to complete an inspection in accordance with this invention.

This technique has the advantage that the switching rate and load per scan are reduced and that greater effective separation can be obtained between address holes, thus avoiding crosstalk problems. It also allows addresses to be positioned along or near the same radius. Another useful advantage is that, for those radars in which such feature is not included, a useful degree of range correction can be obtained. This can be achieved by reducing the gain appropriately on the scans in the steps corresponding to the address steps on the nearest range classes and increasing the gain as the range classes are further and further away.

Referring back to FIGURE 5, all that is added to FIGURE 1, to accomplish a range sector by range-sector scan, is a four-count cyclic counter 100. The output of the pulse-generating circuit 40 is applied to this counter, instead of to the counter 44, as before. The counter 44 is advanced by the output of the range counter 100 each time it is returned to its first count state from its fourth count state. The four outputs of range counter 100 are applied to the range control of the radar receiver where, in a fashion well known to those skilled in the art, the successive range sectors are scanned as the counter advances through its four counts.

The radar antenna rotates once for each count of the range counter. The counter 44 advances one count for each four counts of the range counter. Thus, twenty-eight rotations of the antenna are required to complete a scan of a region using four range sectors and three precipitation classes. The apparatus shown in FIGURE 4 operates in the same manner as previously described; only the precipitation intensity for a range sector at a time is shown, however.

It is possible to reduce the number of antenna rotations to effectuate a precipitation intensity scan to one rotation or antenna scan for each class of precipitation intensity by providing circuits which produce, in response to an input pulse, the number of pulses manifested for each class. Since class 1 is manifested by a single precipitation-indicating pulse, this presents no problem. Class 2 and class 3, which require three pulses each, can employ an oscillator which emits three pulses for each input pulse. The only changes required in accordance with the above would be in FIGURE 1, where the counter 44 is now made a three-count counter, instead of seven. The first, second, and third outputs of this counter, together with an output from the pulse-generating circuit 22, are employed to energize the oscillators which emit three pulses over the transmission line 24.

It should be appreciated from the foregoing description that the conversion of the picture presented on the precipitation-indicating radar cathode-ray tube is converted into a simple electrical form, consisting of a few signal pulse trains. This information can be transmitted by any of the known transmission methods. Synchronizing and parity-checking data, as well as other message data, can be sent along with this data, if desired. This data makes very modest demands on standard transmission lines; for example, it sends a complete message in time which is only a little longer than the period covered in four antenna revolutions—under one minute. Such reports can be continuous or made at intervals, or can be collected and stored on a medium such as magnetic tape for subsequent rapid transmission.

There has accordingly been described and shown herein a novel and useful precipitation-indicating system which provides a display which is simple to understand, while presenting information on total rainfall and instantaneous intensity.

I claim:

1. In a system for indicating precipitation of the type wherein a radar apparatus is employed to scan an area and indicate the presence of precipitation at any location within said area by the emission of light from a corresponding position on the face of a cathode-ray tube employed with said radar apparatus, a precipitation-indicating system comprising means for generating precipitation-indicating pulses responsive to the emission of light at predetermined positions over the face of said cathode-ray tube corresponding to predetermined locations within said area, means for generating an address pulse for each said predetermined position in synchronism with the scan by said radar of said predetermined location, and means for presenting an indication of the precipitation occurring simultaneously at all of the predetermined locations scanned by said radar apparatus responsive to said address and precipitation-indicating pulses.

2. In a system for indicating precipitation of the type wherein a radar apparatus is employed to scan an area and indicate the presence of precipitation at any location within said area by the emission of light from a corresponding position on the face of a cathode-ray tube employed with said radar apparatus, a precipitation-indicating system comprising means for generating precipitation-indicating pulses responsive to the emission of light at predetermined positions over the face of said cathode-ray tube corresponding to predetermined locations within said area, means for generating an address pulse for each said predetermined position in synchronism with the scan by said radar of a predetermined location, and means for presenting a visual indication of the precipitation over the region scanned comprising a map of the area being scanned for the presence of precipitation, means for illuminating when rendered operative each location on said map corresponding to a predetermined position on said cathode-ray tube face, and means to which said precipitation-indicating pulses and said address pulses are applied for rendering said means for illuminating operative at each location in the presence of both pulses.

3. In a system for indicating precipitation of the type wherein a radar apparatus is employed to scan an area and indicate the presence of precipitation at any location within said area by the emission of light from a corresponding position on the face of a cathode-ray tube employed with said radar apparatus, a precipitation-indicating system comprising means for generating precipitation-indicating pulses responsive to the emission of light at predetermined positions over the face of said cathode-ray tube corresponding to predetermined locations within said area, means for generating an address pulse for each said predetermined position in synchronism with the scan by said radar of a predetermined location, a separate counter for and associated with each of said predetermined positions, switch means to which said address pulses are applied for selecting a counter associated with a predetermined position designated by an address pulse, and means for applying said precipitation pulses to said switch means to actuate each counter to totalize the amount of precipitation at the associated predetermined location.

4. In a system for indicating precipitation of the type wherein a radar apparatus is employed to scan an area and indicate the presence of precipitation at any location within said area by the emission of light from a corresponding position on the face of a cathode-ray tube employed with said radar apparatus, a precipitation-indicating system comprising means for generating precipitation-indicating pulses responsive to the emission of light at predetermined positions over the face of said cathode-ray tube corresponding to predetermined locations within said area, means for generating an address pulse for each said predetermined position in synchronism with the scan by said radar of a predetermined location, means for cyclically controlling said radar apparatus on successive scans of said area to require precipitation intensity at each of said predetermined locations to exceed a predetermined level before a precipitation pulse can be derived, and means to which said address pulses and said precipitation-indicating pulses are applied to present for each cycle of operation of said means for cyclically controlling an indication of the intensity of precipitation existing at all of said locations.

5. In a system as recited in claim 4 wherein said means to present an indication at all of said locations of the intensity of precipitation includes for each of said predetermined locations a plurality of indicators, a different indicator in said plurality being provided for each predetermined intensity of precipitation, means at each location to which precipitation pulses are applied for energizing in response to the number of received precipitation pulses the one of said indicators which is assigned to indicate the intensity of precipitation represented by that number of precipitation pulses, and means responsive to said address pulses to select for application of precipitation pulses the one of said means at each location to which precipitation pulses are applied corresponding to the predetermined position on said cathode-ray tube face from which said precipitation pulses are derived.

6. In a system for indicating precipitation of the type wherein a radar apparatus is employed to scan an area and indicate the presence of precipitation at any location within said area by the emission of light from a corresponding position on the face of a cathode-ray tube employed with said radar apparatus, a precipitation-indicating system comprising means for generating precipitation-indicating pulses responsive to the emission of light at predetermined positions over the face of said cathode-ray tube corresponding to predetermined locations within said area, means for generating an address pulse for each said predetermined position in synchronism with the scan by said radar of a predetermined location, means for cyclically controlling said radar apparatus on successive scans of said area to require precipitation intensity at each of said predetermined locations to exceed a predetermined level before a precipitation pulse can be derived, a separate counter for and associated with each of said predetermined positions, switch means to which said address pulses are applied for selecting a counter associated with a predetermined position designated by an address pulse, and means for applying said precipitation pulses to said switch means to actuate each counter to totalize the amount of precipitation at the associated predetermined location.

7. In apparatus as recited in claim 6 wherein there is included a counter, and means for applying all said precipitation pulses to said counter to totalize the precipitation for the entire area being scanned.

8. In a system for indicating precipitation wherein a radar system employing a cathode-ray tube is used to scan an area for precipitation the improvement comprising a first mask positioned in front of the cathode-ray tube of said radar system, said mask having a plurality of apertures each one of which is positoned adjacent a location on said cathode-ray tube face for which an indication of the presence or absence of precipitation is desired, photoelectric means positioned adjacent said first mask to be energized by any light passing through the apertures therein, means for converting said phototube output into precipitation-indicating pulses, a second mask having therein a plurality of apertures equal in number to the plurality of apertures in said first mask, light means on one side of said second mask, a second photocell means on the other side of that said second mask, each of the apertures in said second mask being associated with a different one of the apertures in said first mask, means for moving said second mask in synchronism with the scanning operation of said radar to interpose an aperture of said second mask between the light source and the second photocell means just prior to a possible illumination of its associated aperture in said first mask, means for converting the output of said second photocell means to address pulses, a third mask having a plurality of apertures each of said apertures on said third mask corresponding to and being associated with an aperture on said first mask, a light means positioned at one side of each aperture in said third mask, means for illuminating each light means, means responsive to said address pulses to apply each one of the precipitation-indicating pulses to said means for illuminating each light means to illuminate an aperture associated with an aperture in said first mask opposite a location from which said precipitation signal was derived, means for maintaining said light means illuminated until the end of a complete scan of an area by said radar system, and means for discontinuing the illumination of said light means at the end of a complete scan.

9. Apparatus as recited in claim 8 wherein there is included means for cyclically controlling said radar system on successive scans of said area to require a precipitation intensity at each of said predetermined locations to exceed a predetermined level before a precipitation pulse can be derived, each said light means includes a different light representative of a different precipitation level, each said means for illuminating each light means includes means for adding the precipitation pulses applied thereto and for illuminating the light representing the precipitation level indicated by the total of said applied precipitation pulses.

10. In a system of the type wherein a radar apparatus is employed for scanning an area for the presence or absence of precipitation, means for providing a display indicative of the intensity of precipitation at each of a pluality of predetermined locations in said area comprising a first apertured mask positioned adjacent the face of a cathode-ray tube employed for display in said radar system, said first apertured mask having a plurality of apertures positioned adjacent predetermined locations for which an indication of precipitation is desired, means for deriving from said cathode-ray tube face for each aperture a separate precipitation pulse train representing by the total number of pulses the intensity of precipitation at the predetermined locations, means for generating an address pulse train each pulse of which represents the address of a different aperture in said first mask, a second mask, said second mask having a plurality of apertures each of which is associated with a different one of said plurality of apertures in said first mask, a different adding means for each of said apertures in said second mask for totalizing the number of pulses in the precipitation pulse train derived through the associated aperture in said first mask, means for applying to each said different means the proper precipitation pulse train responsive to said address pulse train, a plurality of precipitation-intensity indicators each of which is positioned to be visible through a different one of said apertures of said second mask, and means for energizing each of said precipitation-intensity indicators responsive to the precipitation pulses derived from associated apertures of said first apertured mask to indicate the intensity of precipitation.

No references cited.